United States Patent
DeLay et al.

(10) Patent No.: US 11,206,180 B2
(45) Date of Patent: Dec. 21, 2021

(54) METHODS, SYSTEMS AND APPARATUSES FOR IMPLEMENTING TIME-TRIGGERED ETHERNET (TTE) FEATURE SET SCHEDULING WITH CONFIGURATION-DIVISION MULTIPLEXING (CDM) TO SUPPORT IN SITU RE-CONFIGURATION AND COMPLEX SYSTEM COMMISSIONING

(71) Applicant: HONEYWELL INTERNATIONAL INC., Morris Plains, NJ (US)

(72) Inventors: Benjamin F. DeLay, Cave Creek, AZ (US); William T. Smithgall, League City, TX (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 44 days.

(21) Appl. No.: 16/867,628

(22) Filed: May 6, 2020

(65) Prior Publication Data
US 2021/0351979 A1 Nov. 11, 2021

(51) Int. Cl.
*G06F 15/177* (2006.01)
*H04L 12/24* (2006.01)

(52) U.S. Cl.
CPC ............... *H04L 41/0813* (2013.01)

(58) Field of Classification Search
CPC ................................ H04L 41/0813
USPC ....................................... 709/221
See application file for complete search history.

(56) References Cited

U.S. PATENT DOCUMENTS

| | | | |
|---|---|---|---|
| 5,671,355 A | 9/1997 | Collins | |
| 7,675,919 B2 * | 3/2010 | Vestal | H04L 47/50 370/395.4 |
| 7,839,868 B2 * | 11/2010 | Kopetz | H04J 3/0655 370/401 |
| 9,317,351 B2 | 4/2016 | Hilliges et al. | |
| 9,596,091 B2 | 3/2017 | Butler et al. | |
| 10,050,805 B2 * | 8/2018 | Fidi | H04L 12/4035 |
| 10,374,873 B2 | 8/2019 | Toepke et al. | |
| 10,374,894 B2 * | 8/2019 | Miller | G05B 23/0256 |
| 10,887,244 B1 * | 1/2021 | DeLay | H04L 47/56 |
| 2010/0183016 A1 * | 7/2010 | Bonk | G06F 1/14 370/400 |
| 2016/0294721 A1 * | 10/2016 | Varadarajan | H04L 47/621 |
| 2017/0320453 A1 | 11/2017 | Soe | |

(Continued)

*Primary Examiner* — Atta Khan
(74) *Attorney, Agent, or Firm* — Lorenz & Kopf, LLP

(57) ABSTRACT

Methods, systems, and apparatuses for orchestrating the re-configuration of a Time-Triggered Ethernet (TTE) network for a plurality of configuration definitions (CDs) within a network configuration superset (NCS) by a Network Scheduling Tool (NST), including coupling a plurality of FSs to at least one common control FS (CCFS) to enable control by the NST of each FS by a runtime procedure wherein each FS of the plurality of FSs is composed of Virtual Links (VLs); scheduling the plurality of features sets (FSs) based on a target configuration of a specified FSs coupled to the CCFS within the TTE network; collecting, in a first scheduling pass by the NST, multiple FSs related to a plurality of phase configurations wherein the FSs are used to derive a specified target FS configuration; and forming a common FS by using an application to determine features associated with each FS of the plurality of FSs.

20 Claims, 12 Drawing Sheets

(56) References Cited

U.S. PATENT DOCUMENTS

2019/0174207 A1 6/2019 Cella et al.
2020/0021775 A1 1/2020 O'Connell et al.

* cited by examiner

TTE NETWORK W/FEATURE SETS DATA FLOWS

ACTIVE ITEMS IN CCS

ACTIVE ITEMS IN LAUNCH PHASE

ACTIVE ITEMS IN DOCKING PHASE

DOCKING PHASE WITH REDUCED RATE CCS

EXEMPLARY CCS SCHEDULE

EXEMPLARY LAUNCH PHASE SCHEDULE

EXEMPLARY DOCKING PHASE SCHEDULE

DOCKING PHASE SCHEDULE WITH CCS RATE REDUCTION

METHODS, SYSTEMS AND APPARATUSES FOR IMPLEMENTING TIME-TRIGGERED ETHERNET (TTE) FEATURE SET SCHEDULING WITH CONFIGURATION-DIVISION MULTIPLEXING (CDM) TO SUPPORT IN SITU RE-CONFIGURATION AND COMPLEX SYSTEM COMMISSIONING

TECHNICAL FIELD

The present disclosure generally relates to methods, systems, and apparatuses for scheduling in time-triggered Ethernet (TTE) networks, and more particularly for specifying feature sets (FSs) and the use of specifications of one or more target TTE network configuration definitions (CDs) that include various combinations of the FSs for in situ system re-configuration and complex system commissioning.

BACKGROUND

Three basic approaches to system configuration include a re-configuration based on a superset system, an orchestrated re-configuration, and a hybrid re-configurable system. The superset approach is the simplest approach wherein designers create a superset of all known configurations, including all VL definitions and schedules, to limit the amount of re-configuration required to execute a state transition in the running system. Employing this method would likely exhaust network resources, but could reduce CPU utilization in end systems by employing intelligent input/output (I/O) control.

The implementation of orchestrated re-configuration can be considered a complex approach to system configurability and can either be accomplished in complete or incremental steps to the eventual re-configured system. The complete re-configuration approach may involve multiple sets of matched network configurations, and those matched configuration tables can either be resident in network hardware or dynamically loaded during system operation. No commonality is required between the multiple network configurations for complete re-configuration to operate. For the complete re-configuration approach, all the network devices should receive a coordinated broadcast command to update the active configuration table to the desired next configuration followed by a reset command, if required by the hardware implementation. The entire system network, as a result, can be unavailable for an extended period, depending on hardware requirements for configuration table activation, before continuing with normal operation in the new configuration.

Incremental re-configuration requires some amount of commonality among the different network configurations. Common sets of VLs are grouped, with at least one group common to all network configurations supported in the re-configurable superset. The common control group is scheduled using the exact trigger and arrival times in all network configurations. The same is true for all other VL groups as much as possible. Synchronization configuration remains the same in all network configurations. This allows variation in the composition of VLs that make up a given complete network implementation while preserving as much commonality between them as possible. During the re-configuration process, specified upgrade zones would be moved to the new configuration. For example, one redundant plane of network switch cards would transition to the new configuration, followed by a specific group of end-system network interface cards. This process continues, incrementally, until the transition is complete. Since the common control group is scheduled identically in all network configurations, critical control of the vehicle is preserved throughout the transition. In this way, incremental re-configuration eliminates the system unavailability typified by a complete re-configuration approach, but reductions in fault tolerance capabilities may be realized during transitions.

Moreover, the plans for future space vehicles include docking and connecting multiple vehicles together with the sharing of command and control responsibilities among the devices distributed throughout a composed network in a process called complex system commissioning. For long-duration mission systems and vehicles, there is a need to re-configure the vehicle based on configuration changes that occur over time in the mission and/or to prepare to connect with other newly developed vehicles during the mission. Therefore, it is desirable to provide a configuration-aware solution that distributes resource allocation across different configuration domains with a runtime capability of switching between configurations safely during vehicle operation to support multiple use cases.

Hence, there is a need for methods, systems, and apparatuses for a hybrid approach to system re-configuration that combines feature set (FS) scheduling with the simplicity of the system superset specification. Other desirable features and characteristics will become apparent from the subsequent detailed description and the appended claims, taken in conjunction with the accompanying drawings and the foregoing technical field and background.

BRIEF SUMMARY

Methods, systems, and apparatuses are provided for scheduling a plurality of VLs in a TTE network.

In an exemplary embodiment, a method for orchestrating the re-configuration of a Time-Triggered Ethernet (TTE) network by providing scheduling and configuration information for a plurality of configuration definitions (CDs) within a network configuration superset (NCS) by a Network Scheduling Tool (NST), including: coupling a plurality of feature sets (FSs) to at least one CD within the NCS for the TTE network enabling multiplexed configuration switching control by the runtime system wherein each FS of the plurality of FSs is composed of at least one Virtual Link (VL) specification, metadata such as identification information, and miscellaneous data such as inter-VL timing and protocol information for the VL specifications in the FS, each CD is composed of at least one FS, metadata such as identification information, and miscellaneous data such as modification information for VL specifications within a referenced FS, and the NCS is composed of at least one CD, metadata such as identification information, and miscellaneous data such as network-wide static configuration parameters; scheduling, by the NST, the VL specifications defined in a plurality of features sets (FSs) of the TTE network based on at least one target CD of specified FSs within the TTE network; collecting, in a first scheduling pass by the NST, multiple FSs related to a plurality of CDs wherein one or more of the FSs is referenced by more than one CD; and forming, by the NST, a common control feature set (CCFS) by using an application to determine the FSs common to all specified CDs in the NCS.

In various exemplary embodiments, the method including populating, by the NST, a timeline divided into a generic global bin set designated as a baseline bin set for use in successive scheduling passes, wherein the global bin set is preserved by the NST for further processing of the plurality of FSs and populating of the timeline in successive pass operations. The method further including reconfiguring incrementally as specified in at least one upgrade zone of an individual plane of the TTE network wherein the NSCs operating on that plane transition from a current CD to a newly specified CD associated with different FSs. The method further including synchronizing, by the NST, by scheduling in a similar manner using the CCFS other FSs resulting in configured sets of VLs with a least amount of variations that compose the other FSs and preserving at least some commonality between FSs in multiple target CDs in the NCS of the TTE network. The method further including re-configuring, by the runtime system, using specified upgrade zones composed of select NSC planes each new table associated with a corresponding CD until in incremental transitions a final CD configuration transition is completed. The method further including scheduling, by the NST, using the CCFS to preserve critical control of phases of vehicle operation throughout each incremental transition wherein any mutually exclusive FSs can be scheduled on top of existing scheduled FSs enabling VLs in each FS configuration to be configured in accordance with one set of Network Interface Card (NIC) tables. The method further including producing, by the NST, a unique table for use by the NSC per target CD.

In another exemplary embodiment, a system for scheduling a plurality of Feature Sets (FSs) in a Time-Triggered Ethernet (TTE) network using a network scheduling tool (NST), each of the plurality of VLs having a scheduled rate is provided. The system includes a plurality of FSs coupled to at least one CD in an NCS and a Network scheduling tool (NST), the NST configured to schedule a plurality of features sets (FSs) of the TTE network based on at least one target CD of specified FSs within the TTE network; collect, in a first scheduling pass by the NST, multiple FSs related to a plurality of CDs wherein one or more of the FSs is referenced by more than one CD; and forming, by the NST, a common control feature set (CCFS) by using an application to determine the FSs common to all specified CDs in the NCS.

In various exemplary embodiments, the system includes, the NST further configured to: populate a timeline associated with each FS using a generic global bin set designated as a baseline bin set for use in successive scheduling passes, wherein the global bin set is preserved by the NST for further processing of the plurality of FSs and populating of the timeline in successive pass operations.

The system includes the runtime system further configured to re-configure incrementally as specified in at least one upgrade zone of an individual plane of the TTE network wherein the NSCs operating on that plane transition from a current CD to a newly specified CD associated with a different FSs. The system includes the NST further configured to: synchronize by scheduling in a similar manner using the CCFS other FSs resulting in configured sets of VLs with the least amount of variations that compose the other FSs and preserving at least some commonality between FSs in multiple target CDs in the NCS of the TTE network. The system includes the runtime system further configured to re-configure using specified upgrade zones composed of select NSC planes each new table associated with a corresponding CD until in incremental transitions a final CD configuration transition is completed. The system further includes the NST configured to schedule using the CCFS to preserve critical control of phases of vehicle operation throughout each incremental transition wherein any mutually exclusive FSs can be scheduled on top of existing scheduled FSs enabling VLs in each FS configuration to be configured in accordance with one set of Network Interface Card (NIC) tables. The system further includes the NST configured to: produce a unique table for use by the NSC per target CD.

In yet another exemplary embodiment, an apparatus including a Network Scheduling Tool (NST) for scheduling a plurality of configuration definitions (CDs) within a network configuration superset (NCS) in a Time-Triggered Ethernet (TTE) network, is provided. The NST is configured with a processor programmed by a set of instructions to schedule time-triggered traffic wherein each CD in the NCS is coupled to a plurality of FSs within the TTE network enabling control by the processor of NST, the processor configured to schedule the VL specifications defined in a plurality of features sets (FSs) of the TTE network based on at least one target CD of specified FSs within the TTE network; collect, in a first scheduling pass by the NST, multiple FSs related to a plurality of CDs wherein one or more of the FSs is referenced by more than one CD; and form a common control feature set (CCFS) by using an application to determine the FSs common to all specified CDs in the NCS.

In various exemplary embodiments, the NST further configured to: populate a timeline associated with each FS and VL specification using a generic global bin set designated as a baseline bin set for use in successive scheduling passes, wherein the global bin set is preserved by the NST for further processing of the plurality of FSs and populating of the timeline in successive pass operations.

The runtime system further configured to re-configure incrementally using specified upgrade zones composed of select NSC planes each new table associated with a corresponding CD until in incremental transitions a final CD configuration transition is completed. The NST further configured to: synchronize by scheduling in a similar manner using the CCFS other FSs resulting in configured sets of VLs with a least amount of variations that compose the other FSs and preserving at least some commonality between FSs in multiple target CDs in the NCS of the TTE network.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

Figure 1:
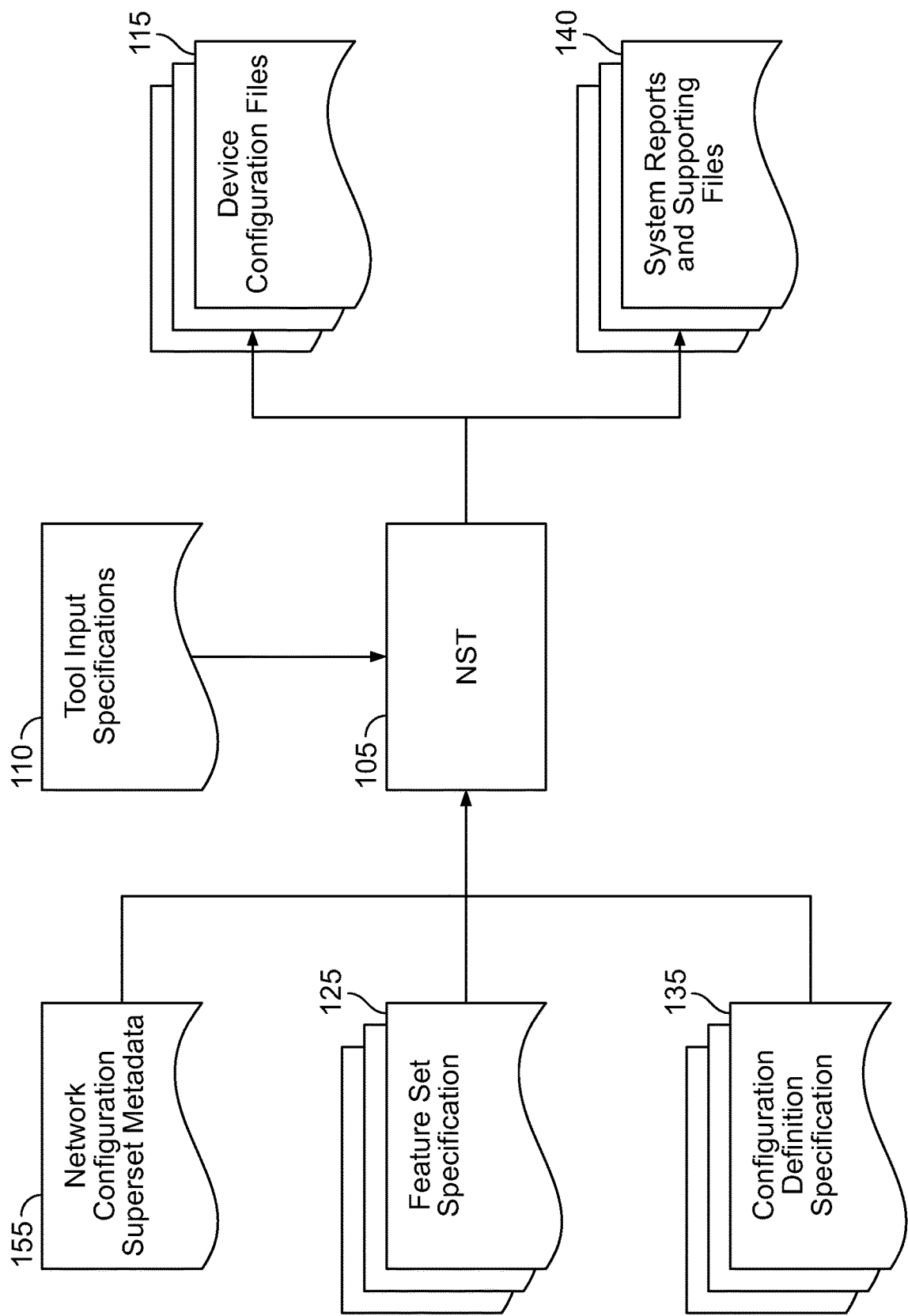
FIG. 1 is a functional diagram of the layout of the time-triggered Ethernet (TTE) network with a network scheduling tool (NST) controlled by a feature set specification and tool input specification in accordance with various embodiments.

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Space vehicles include docking and connecting multiple vehicles together and sharing command and control responsibilities among the devices distributed throughout the composed network. For long-duration mission vehicles such as the Gateway, there is also an opportunity to re-configure the vehicle based on configuration changes over time or to prepare for connections to newly developed vehicles. There is a need to provide a configuration-aware solution that distributes resource allocation across different configuration domains with a runtime capability of switching between configurations safely during vehicle operation to support these use cases.

While the present disclosure describes methods and systems applicable to space vehicles, it is contemplated the implementations of target feature sets, and configuration awareness solutions are equally applicable to a variety of different types of vehicles including but not limited to automotive, aviation, and utility-type vehicles. Also, the configuration awareness solutions may, or can be implemented in fully autonomous, semi-autonomous, or driver-assisted vehicles.

Instead of implementing a superset approach, there is a need for a system that utilizes configuration-division multiplexing (CDM) while leveraging Network Switch Cards (NSCs) as bus guardians to provide a nearly-seamless re-configuration process. There is a need that all mutually exclusive FSs can be scheduled on top of existing scheduled FSs such that the VLs in these configurations will be based on one set of network interface card (NIC) tables. A unique configuration table for each NSC is produced per target configuration definition, so current-generation TTE NSCs require a reset to transition to a new configuration. For long-term vehicle commissioning, combining the hybrid approach with incremental re-configuration allows greater changes to the VL sets. Since the hybrid network tooling is deterministic, FSs can likely be combined in a variety of ways to make future vehicle integration a seamless operation.

In various exemplary embodiments, the present disclosure describes systems, methods, and apparatuses for designing a spacecraft control system with an innate awareness of varying system configurations that lay the foundation for CDM. CDM allows the system to realize the runtime benefits of dynamic input/output (I/O) configurations while retaining the composable and verifiable nature of systems with static I/O definitions. In its most basic form, high-integrity modules control the active configuration definition of the system and transition between configuration definitions, acting as the selector in the multiplexed environment. The superset of configuration definitions loaded into the system represent all designed combinations of supported I/O configurations. Each configuration definition represents a wholly functioning and independently verifiable static I/O implementation for a given vehicle configuration, mission phase, or any other unique state that the system must support.

The implementation of CDM in some current TTE-capable hardware requires some amount of commonality among the configuration definitions. In various exemplary embodiments of the present disclosure, the common sets of VLs are grouped into Feature Sets (FS), with at least one common control FS (CCFS) common to all configuration definitions supported in the reconfigurable set. The CCFS is scheduled and configured identically in all configuration definitions. This allows variation in the composition of VLs that make up a given configuration definition while preserving as much commonality between them as possible. During the re-configuration process, specified upgrade zones (i.e., one plane of NSCs) move to the new configuration and continue until the transition is complete.

This present disclosure describes additional data flows to the network scheduling tool suite to allow the specification of VLs grouped into FSs and the specification of one or more target configuration definitions that include various combinations of the FSs. More information must also be collected regarding the integrity level of target network nodes to support implementations relying on high-integrity NSCs as bus guardians. VL changes between configurations can include but are not limited to reducing the rate of specific VLs and the re-use of VL IDs for different data contents or different source or destination nodes in alternate configuration definitions.

Additionally, in alternate exemplary embodiments of the present disclosure, options are given to the tooling control in the data flow configuration and with behaviors to support the tooling. For example, this support may include incremental re-configuration that results in a hybrid reconfigurable system, with either NSC re-configuration required for both high-integrity and standard-integrity Network Interface Card (NIC) state transitions, or NSC re-configuration required only for standard-integrity NIC state transitions.

In various exemplary embodiments described in the present disclosure, the scheduling tool functionality may be augmented to perform the sorting and optimization of the grouped FSs into the specified target configuration definitions. Multiple schedule passes can be performed on the data sets. The first schedule pass can represent the collection of FSs common to all target configuration definitions, and the result of that schedule pass would be used to populate a generic global bin set to be used as a baseline for each successive schedule pass. The Bin sets resulting from all schedule passes would be preserved by the tool outputs such that subsequent attempts to schedule additional VLs could also be attempted in the future. To support incremental re-configuration, a unique set of formatted network outputs is produced after each specified configuration definition is successfully scheduled. To support the hybrid reconfigurable system, tooling would post-process the successfully scheduled network based on implemented HW constraints to allow the overlapping valid VL definitions to coexist in the loaded network tables. HW constraints are unique to specific versions of target hardware but can include: for example, requirements such as N clocks separating each scheduled VL transmit trigger value. The post-processing logic in the tooling can, therefore, shift any conflicting VLs in time to prevent that overlap and adjust corresponding NSC arrival times accordingly.

In various exemplary embodiments, the present disclosure describes supporting a configuration-aware upgrade to current TTE-enabled hardware since the current hardware generation does not contain any configuration information that specifies the assignment of VLs or other network attributes to one or more target configuration definition. For example, configuration tables defining VL attributes in the TTE network hardware may be updated to contain a bit vector representing a one-hot encoded identifier of valid configuration identifications to enable the application of a current table entry along with a global register that represents a currently-operating configuration definition. In an exemplary example, in a system supporting 16 unique configurations, a 16-bit vector would be required for each entry in each affected table, and a 4-bit value would be required for the global currently-operating configuration register. Logic in the hardware devices would need to be updated to mask and compare the valid configuration vector in table entries to the currently-operating configuration register value to determine if those table entries are valid for the currently-operating configuration. Hence, this relatively small update to the hardware devices would allow the CDM approach to be supported natively in hardware and reduce the burden on software configuration requirements.

In various exemplary embodiments of the present disclosure, the software application implemented can produce data used by the Network Scheduling Tool to perform network scheduling and configuration. The data resides inside the tool and its databases, and is transient and is destroyed and regenerated for each scheduling operation.

In various exemplary embodiments, the identical scheduling of the CCFS preserves critical control of the vehicle throughout the transition. The embodiments described below enable an improved network scheduling tool (NST) to more efficiently utilize the features and capabilities of the underlying network hardware, such as to provide improved network performance with respect to such measures as latency, interference, etc. For example, the embodiments described below enable improved slot time allocation and improved traffic management. Thus, when implemented by the underlying hardware, the schedule and configuration parameters generated by embodiments of the NST described herein result in improved performance of the network. The various features of the NST described herein can be used together or individually depending on the features and capabilities of the underlying network hardware.

In various exemplary embodiments, the present disclosure provides improved enhancements to the NST for scheduling TTE networks. These approaches have been shown to alleviate scheduling difficulties encountered when scheduling data using the baseline implementation. This allows for a significant performance increase in the existing scheduler logic by analyzing and utilizing additional information in the input data set to inform downstream scheduling decisions, providing system designers additional input to control the behavior of the search algorithms, or by creating a dynamic scheduling algorithm based on novel approaches in machine learning shown to be effective for optimization problems.

TT communication sends traffic based on globally synchronized time. The TT packets are sent at predefined times and take priority over most other traffic types in the network. The messages from higher layer protocol can be made TT without modification to the messages themselves. The actual overhead from the protocol that enables TT traffic is sent in special messages. TTE protocol with TT communication is as a result only concerned about when a message is sent not what specific content the message has. The TT traffic is used for applications that require low latency, little jitter, and highly deterministic behavior.

The issued U.S. Pat. No. 9,762,501 B2 to Varadarajan et al. assigned to HONEYWELL® INTERNATIONAL INC., Morris Plain, N.J. (US) is incorporated by reference and provides systems and methods for systematic hybrid network scheduling for multiple traffic classes with host timing and phase constraints using a method of scheduling communications in a network that includes scheduling transmission of VLs about a first traffic class on a global schedule. Also, to coordinate transmission of the Virtual Links about the first traffic class across all transmitting end stations on the global schedule.

The subject matter described here is related to the subject matter described in the U.S. patent application Ser. No. 16/554,128 entitled "METHODS, SYSTEMS, AND APPARATUSES FOR OPTIMIZING TIME-TRIGGERED ETHERNET (TTE) NETWORK SCHEDULING BY BIN ALLOCATION, DEMAND PREDICTION, AND MACHINE LEARNING", is incorporated by reference and describes the implementation of a network scheduling tool (NST) for scheduling in TTE networks by determining a weight for each of the plurality of VLs, the determined weight being proportional to a demand each of the plurality of VLs will place on the time-triggered ethernet network; generating a plurality of bins whose length in time is harmonic to all the scheduled rates of the plurality of VLs. Further, determining a demand value proportional to how often the bin is expected to be used based upon a green zone of each of the plurality of VLs and the determined weight for each of the plurality of VLs, updating the demand value for each bin within the green zone; sorting the plurality of bins from least demanded to most demanded based upon the updated demand value, and scheduling the sorted plurality of VLs within the sorted plurality of bins.

FIG. 1 is a functional diagram of the layout of the time-triggered Ethernet (TTE) network with a network scheduling tool (NST) controlled by a feature set specification and tool input specification in accordance with various embodiments. In FIG. 1, the TTE network includes an NST 105, tool input specification 110, a network configuration superset metadata 155, feature set specification 125, configuration definition specification 135, device configuration files 115, and a system reports and supporting files 140. In the TTE network, the tool input specification 110 defines the configuration of the NST 105 for scheduling the feature sets with inputs from the configuration from the network configuration superset metadata 155, the configuration definition specification 135, and the feature set specification 135. The configuration definition specification 135 defines the different configuration definitions (CDs) contained in the network configuration superset (NCS) with the network configuration superset metadata 155. The NST 5 schedules the different feature sets (FSs) as defined in the feature set specification 125 for different CDs within the NCS for the TTE network enabling multiplexed configuration switching control by a runtime system, The feature set specification 125 may define an FS with a Virtual Link (VL) specification, metadata such as identification information, and miscellaneous data such as inter-VL timing and protocol information for the VL specifications in the FS. Each CD is composed of a FS, of metadata such as identification information, and of miscellaneous data such as modification information for the VL specifications within a referenced FS, and the NCS is composed of a CD, metadata such as identification information, and miscellaneous data such as network-wide static configuration parameters.

The NST 5 schedules the VL specifications defined in different features sets (FSs) of the TTE network by using a target CD of specified FSs within the TTE network. The NST 5 may collect multiple FSs related to different CDs by using a common control feature set (CCFS) and using an application to determine the FSs common to all specified CDs in the NCS. The NST 5 can output device configuration files 115 and system reports and supporting files 140 based on the schedule operations and defined specifications of the different FSs.

Figure 2:
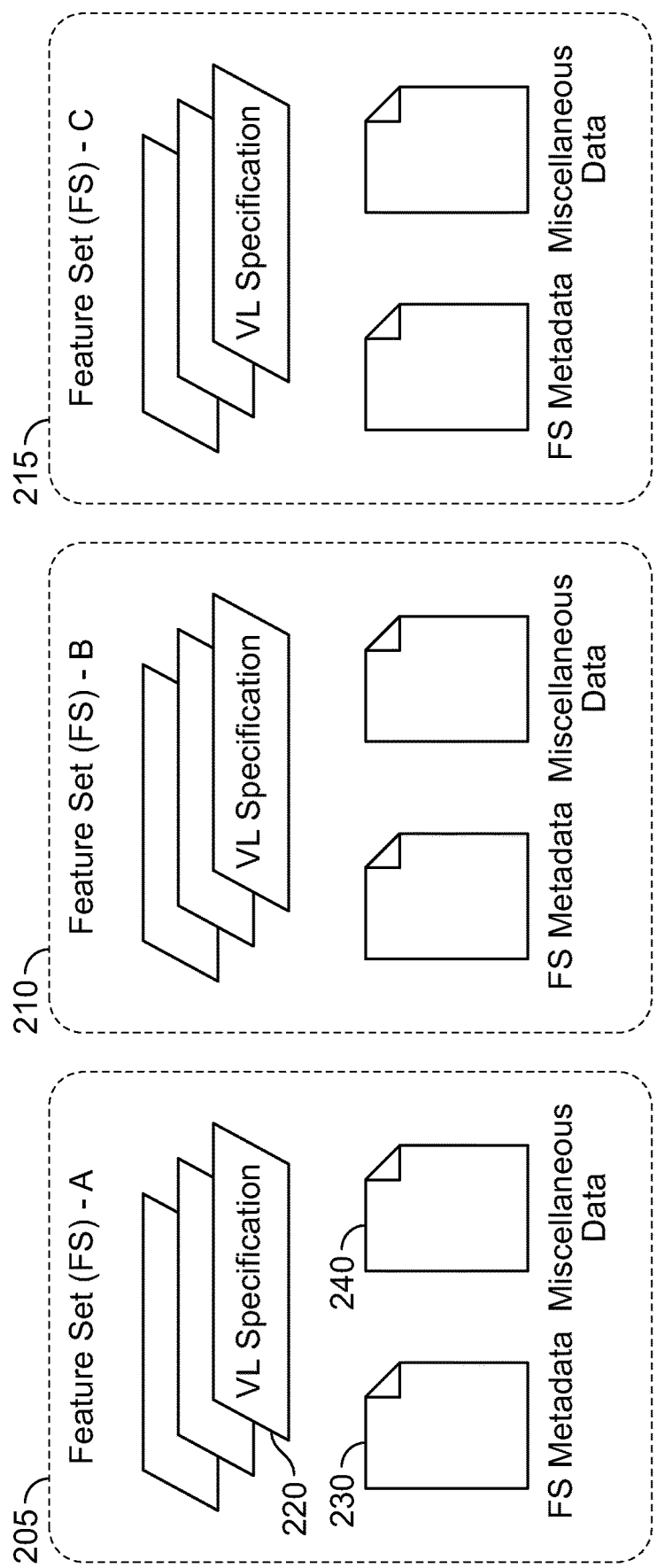
FIG. 2 is a functional diagram of multiple different feature sets scheduled by the NST in accordance with various embodiments.

FIG. 2 is a functional diagram of multiple different feature sets scheduled by the NST in accordance with various embodiments. In FIG. 2, feature set A (205), feature set B (210), and feature set C (215), are each scheduled by the NST 5 (In FIG. 1). Each feature set (FS) is made up of a set of virtual links (VLs) which are configured by a VL specification 220. As an example, the feature set A (205) contains a respective set of FS metadata 230 and miscellaneous data 240 received by the NST 5 for connecting the respective feature set to the NST 5 and other various modules and adapters in the flight phases.

Figure 3:
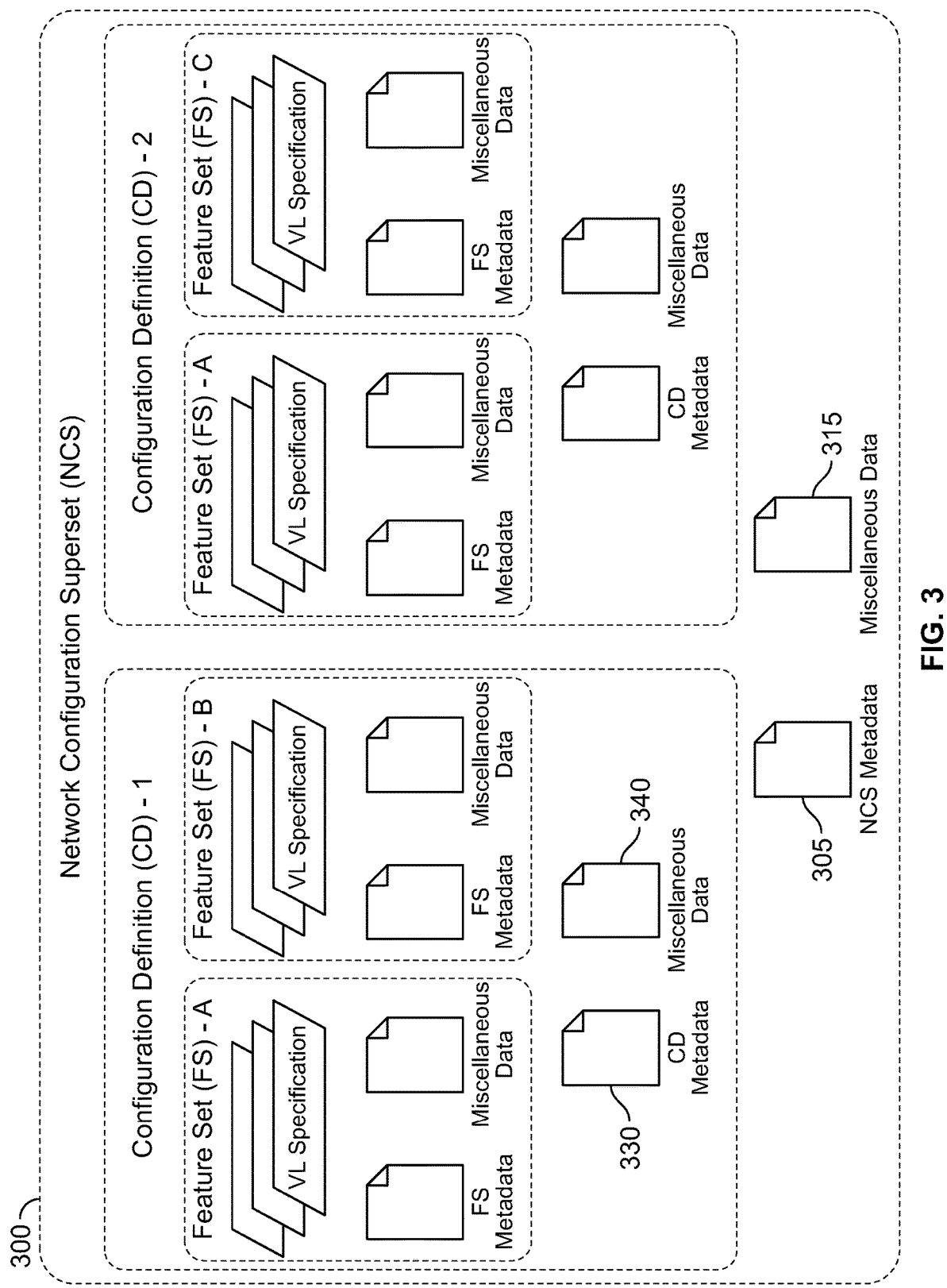
FIG. 3 is a functional diagram of a network configuration superset (NCS) of the TTE network in accordance with various embodiments.

FIG. 3 is a functional diagram of a network configuration superset (NCS) of the TTE network in accordance with various embodiments. In FIG. 3 there is illustrated a network configuration superset (NCS) 300 which is made up of two different combinations of features sets (FSs) that are defined by the respective configuration definition (CD)-1 and CD-2. The NCS 300 includes a set of NCS metadata 305 and miscellaneous data 315 that are used in the scheduling of CD-1 and CD-2 and the respective combinations of FSs that make up CD-1 and CD-2. Each of the FS is configured as illustrated in FIG. 2. For Example, FS-A includes a VL specification 220, FS metadata 230, and miscellaneous data 240 (See FIG. 2). The NST (i.e. NST 105 of FIG. 1) schedules the different FSs (e.g. FS-A, FS-B, FS-C, and FS-D) as defined in the respective FS specification for each of the different CD-1 and CD-2 within the NCS 300.

Figure 4:
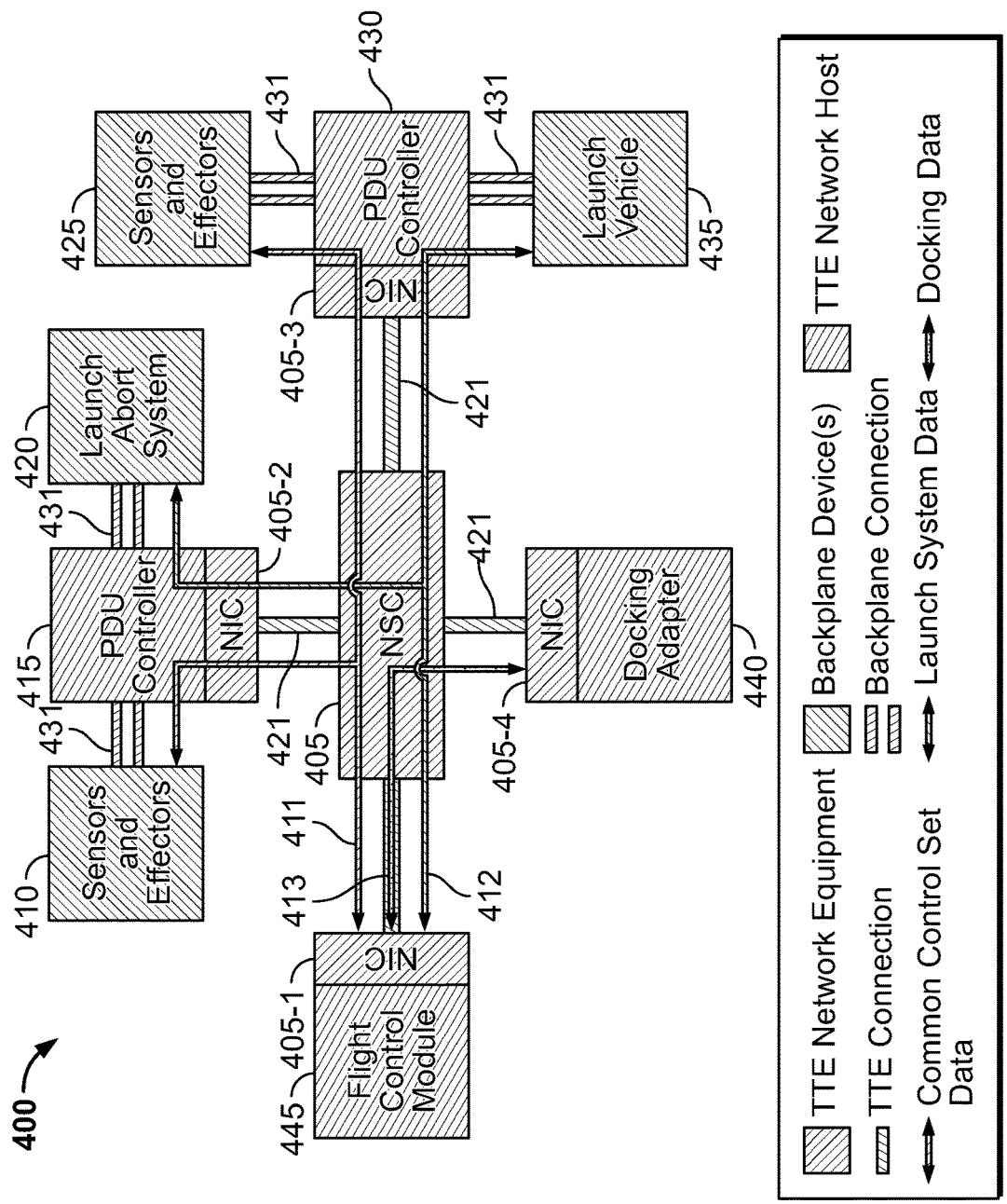
FIG. 4 is a functional block diagram illustrating a time-triggered Ethernet (TTE) network with feature set data flows in accordance with exemplary embodiments.

FIG. 4 is a functional block diagram illustrating a time-triggered Ethernet (TTE) network with feature set data flows in accordance with exemplary embodiments. In FIG. 4 a simplified example TTE network 400 is depicted with three feature sets identified. The common control feature set (CCFS) represents the virtual links (VLs) that remain identically scheduled throughout all configuration definitions.

In FIG. 4, the Time-Triggered Gigabit Ethernet (TTGbE) Network Switch Card (NSC) 405 provides onboard communications between each of the subsystems. TTGbE is a scalable highly deterministic full-duplex Ethernet-compliant network that supports conflict-free command and control using Time-Triggered (TT) traffic, video data using Rate Constrained (RC) critical traffic and maintenance data using standard Ethernet 802.3 Best Effort (BE) non-critical traffic on the same physical interface. The TTGbE NSC 405 has 12-gigabit ports, handing 3 traffic feature sets (the control set data, launch system data, and the docking data), and is associated with one network plane. Fielded fault-tolerant control systems include multiple network planes of similarly-configured NSC devices.

FIG. 4 includes sensors and effectors 410, PDU controller 415, launch abort system 420, sensors and effectors 425, PDU controller 430, launch vehicle 435, docking adapter 440, NSC 405, and flight control module 445. There is a common control feature set (CCFS) data 411 that represents data flow between the sensors and effectors (410), the sensors and effectors (425), and the flight control module 445. The CCFS represents the VLs that remain identically scheduled throughout all configuration definitions. Two independent feature sets are defined for the launch system data (412) and the docking data (413) and can contain launch system and docking feature sets as mutually-exclusive sets of VLs. The docking data for the docking feature set provides communication between the flight control module 445 and the docking adapter 440. The launch system data for the launch feature set provides communication between the launch abort system 420 and the launch vehicle 435.

The TTE connection 421 connects the NSC 405 to each of the modules (i.e. the PDU controller 415, the PDU controller 430, the flight control module 445, and the docking adapter 440) via the respective Network Interface Cards (NICs) 405-1, 405-2, 405-3, and 405-4. The backplane channel 431 connects the PDU controller 430 to the launch vehicle 435 and the sensors and effectors 425. Each of the NICs (405-1, 405-2, 405-3, 405-4) and the NSC 405 represent the TTE network 400 equipment forming the TTE network backbone. The backplane devices consist of the sensors and effectors 410, sensors and effectors 425, launch abort system 420, and the launch vehicle 435. The TTE network 400 is configured in a manner that assigns specific virtual links (VLs) and Commercial-Off-the-Shelf (COTS) data flows to independent feature sets, provides an integrity level of specific devices (i.e. the PDU controller 430, the flight control module 445, the docking adapter 440, the PDU controller 415, etc. . . . ). The TTE network 400 is configured to enable identical timing for feature sets common to multiple independent configurations, and using mutual exclusivity of feature sets to schedule I/O events in an overlapping manner to effectively multiplex shared TTE network resources. The NST tool schedules feature sets of the TTE network 400 based on the target configuration definition of specified features sets within the TTE network 400. The NST tool collects in a first scheduling pass, multiple feature sets associated with the various configuration definitions, and the feature sets collected are processed via various applications to derive a specified target configuration definition. The target configuration definitions are specified as input to the tool, and system designers group one or more VLs into each feature set, then one or more feature sets into a configuration definition. The plurality of configuration definitions includes the network superset configuration.

Also, the NST can populate a timeline associated with each feature set and VL specification using a generic global bin set designated as a baseline bin set for use in successive scheduling passes. In this case, the global bin set is preserved by the NST for further processing of the feature sets and populating of the timeline in successive pass operations. The NSC 405 re-configures incrementally in a defined upgrade zone, one network plane at a time, by triggering a configuration table reload, typically via a software-commanded reset operation, due to current TTE hardware capabilities. The NST schedules the CCFS and other feature sets such that the global schedule contains a lesser amount of variation and allows the CCFS traffic to meet all schedule triggers and arrival checks in every target configuration definition specified for the TTE network 400 superset configuration.

The NST schedule tool can operate to enable re-configuration using specified upgrade zones made up of selected NSC 405 network planes for each new configuration definition which are changed in incremental transitions until the transition to the new configuration definition is completed. The NST may schedule using feature set commonality between configuration definitions, including, for example, the specification of a CCFS, to preserve critical control of phases of vehicle operation throughout each incremental transition. Also, any mutually exclusive feature sets can be scheduled on top of an existing scheduled feature set. This can provide virtual links in each feature set configuration that are formed as instructed in Network Interface Card (NIC) tables. The NST tool can produce a unique configuration table for use by the NSC per target configuration definition. Current generations of NSC 405 hardware require a software-commanded reset to trigger each transition. FIGS. 5-8 are described with reference to the labeling in FIG. 4.

Figure 5:
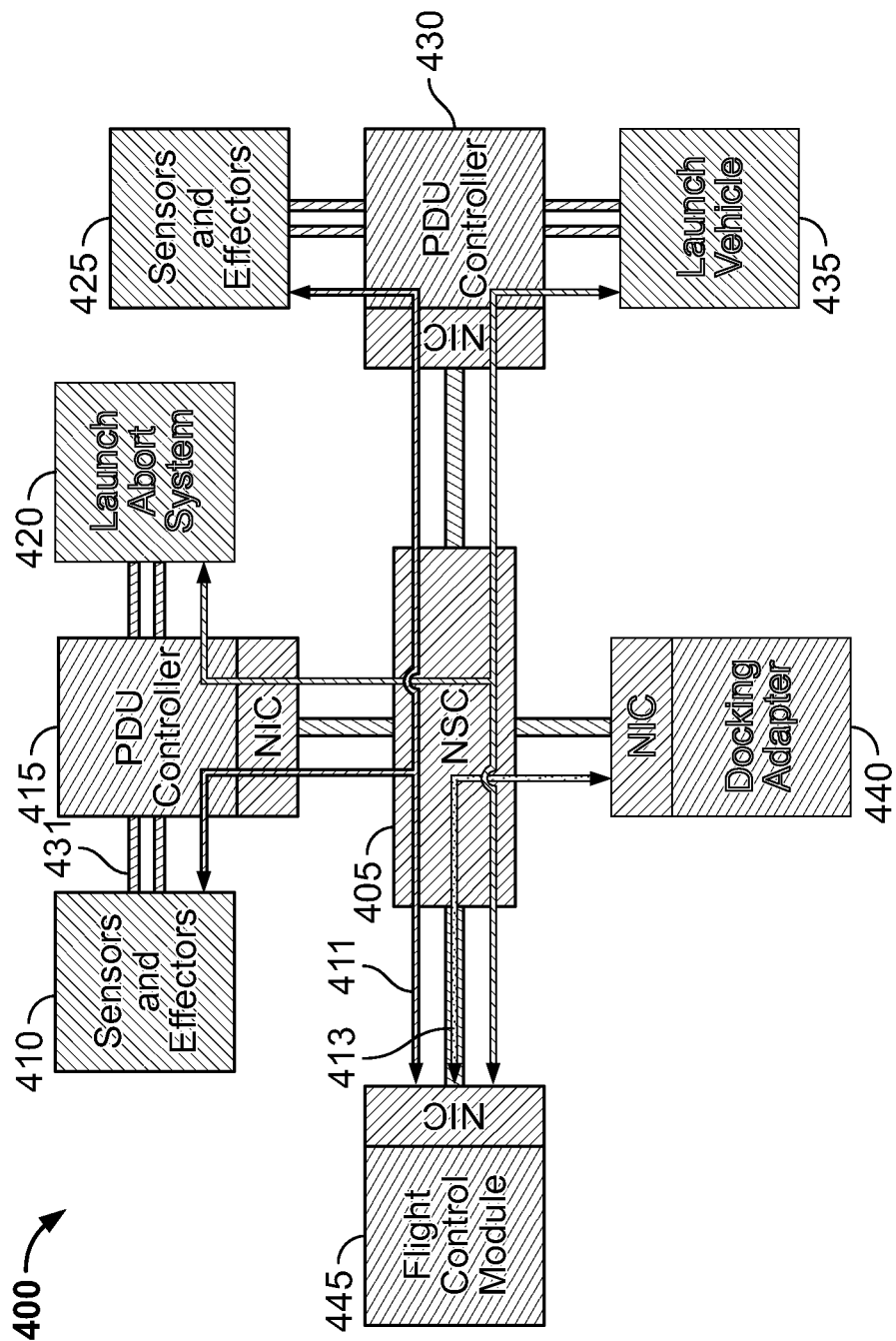
FIG. 5 is a functional block diagram illustrating a TTE network with active items in a common control feature set (CCFS) in accordance with exemplary embodiments.

FIG. 5 is a functional block diagram illustrating a TTE network 400 with active items in a common control feature set (CCFS) in accordance with exemplary embodiments. FIG. 5 depicts exemplary inputs for use by embodiments of the NST schedule tool and exemplary schedule and configuration parameters output by embodiments of the NST schedule tool. In FIG. 5, the common control set data (411) provides communication between the NSC 405, the flight control module 445, the PDU controllers (415, 430), the sensors and effectors 410 and sensors and effectors 425. In FIG. 5, the TTE network 400 shows items active if the spacecraft is in a mission phase where only the CCFS is required. This entails that the flight control module 445 and both PDU controllers (415,430) receive CCFS VL data via NIC (405-1, 405-2, 405-3) in an active mode to receive and send CCFS VL data.

Figure 6:
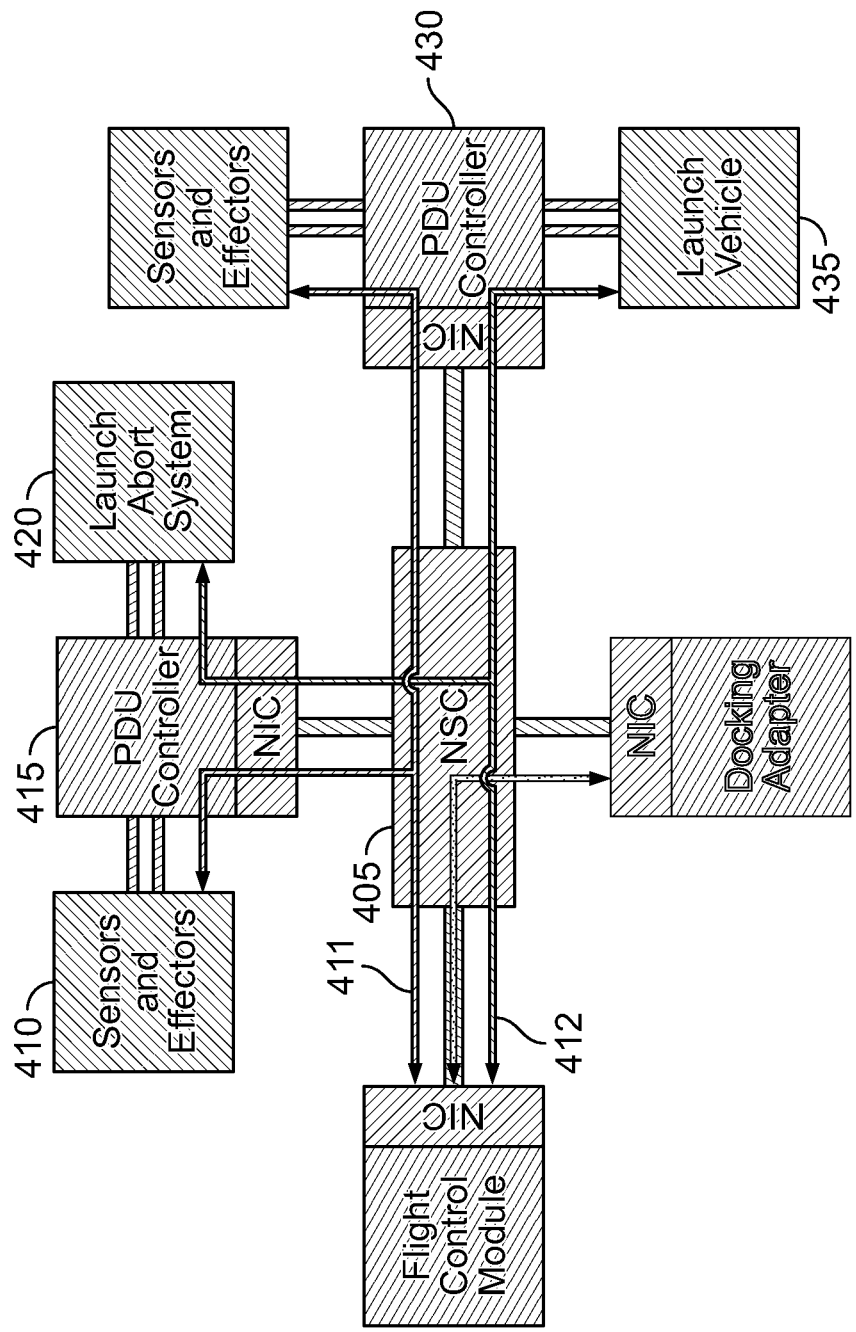
FIG. 6 is a functional block diagram illustrating a TTE network with active items in a common control feature set (CCFS) for an active launch phase in accordance with exemplary embodiments.

FIG. 6 is a functional block diagram illustrating a TTE network 400 of another configuration of feature sets of active items using a common control feature set (CCFS) and a launch system feature set in accordance with exemplary embodiments. In FIG. 6, the launch system feature set 412 and the CCFS 411 are active for items associated with a configuration definition for a launch phase. In this launch configuration, messages are exchanged between the NSC 405, the flight control module 445, the PDU controllers (415, 430), the sensors and effectors 410 and sensors and effectors 425 using the CCFS 411 and the launch system feature set.

Figure 7:
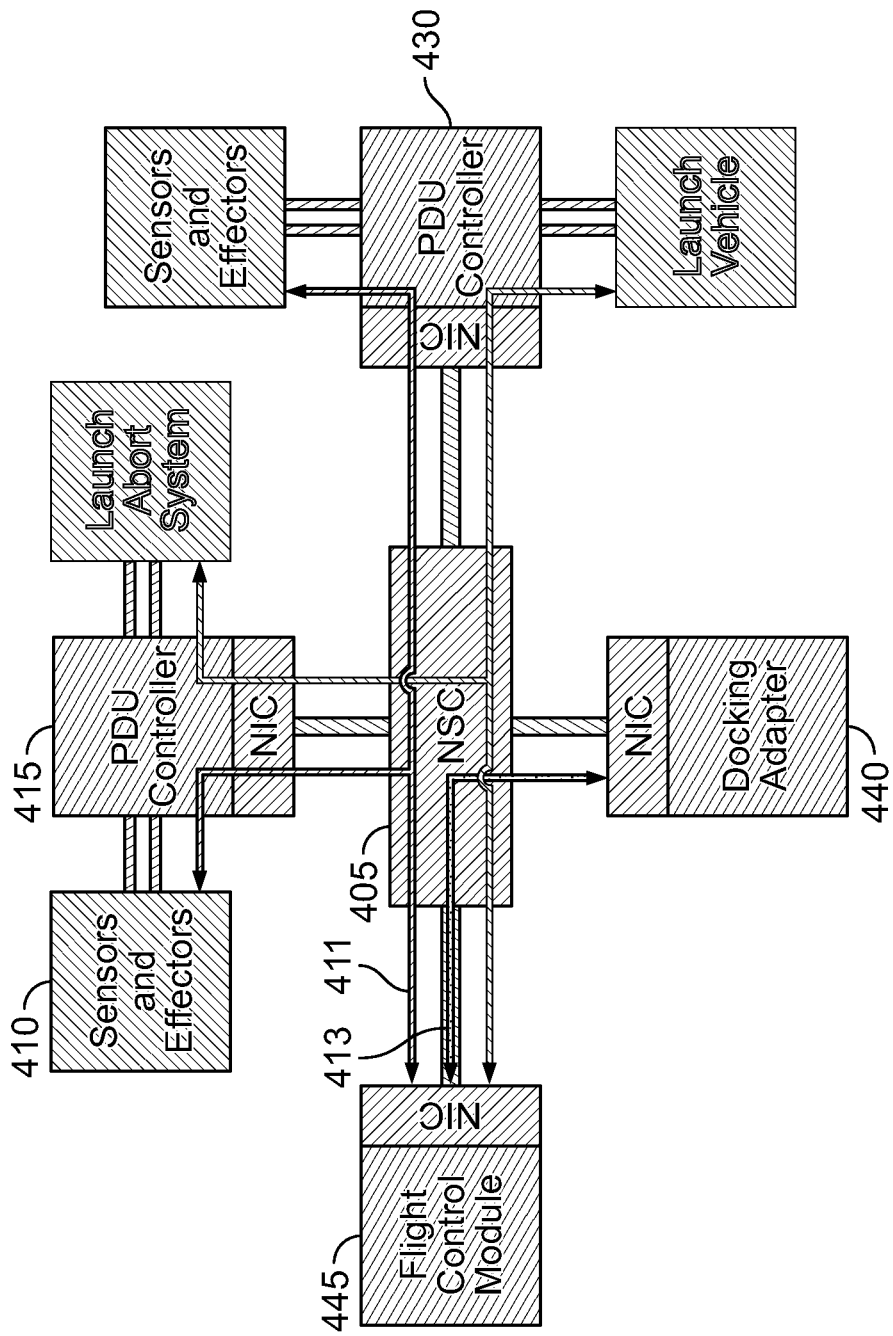
FIG. 7 is a functional block diagram illustrating a TTE network with active items in a common control feature set (CCFS) for a docking phase in accordance with exemplary embodiments.

FIG. 7 is a functional block diagram illustrating a TTE network 400 of a configuration definition of active items using a common control feature set (CCFS) and the docking data feature set in accordance with exemplary embodiments. In FIG. 7, the docking data feature set 413 and the CCFS 411 are active for items associated with a configuration definition for a docking phase. In this docking configuration, messages are exchanged using the docking data feature set 413 between the NSC 405, the flight control module 445, and the docking adapter 440.

Figure 8:
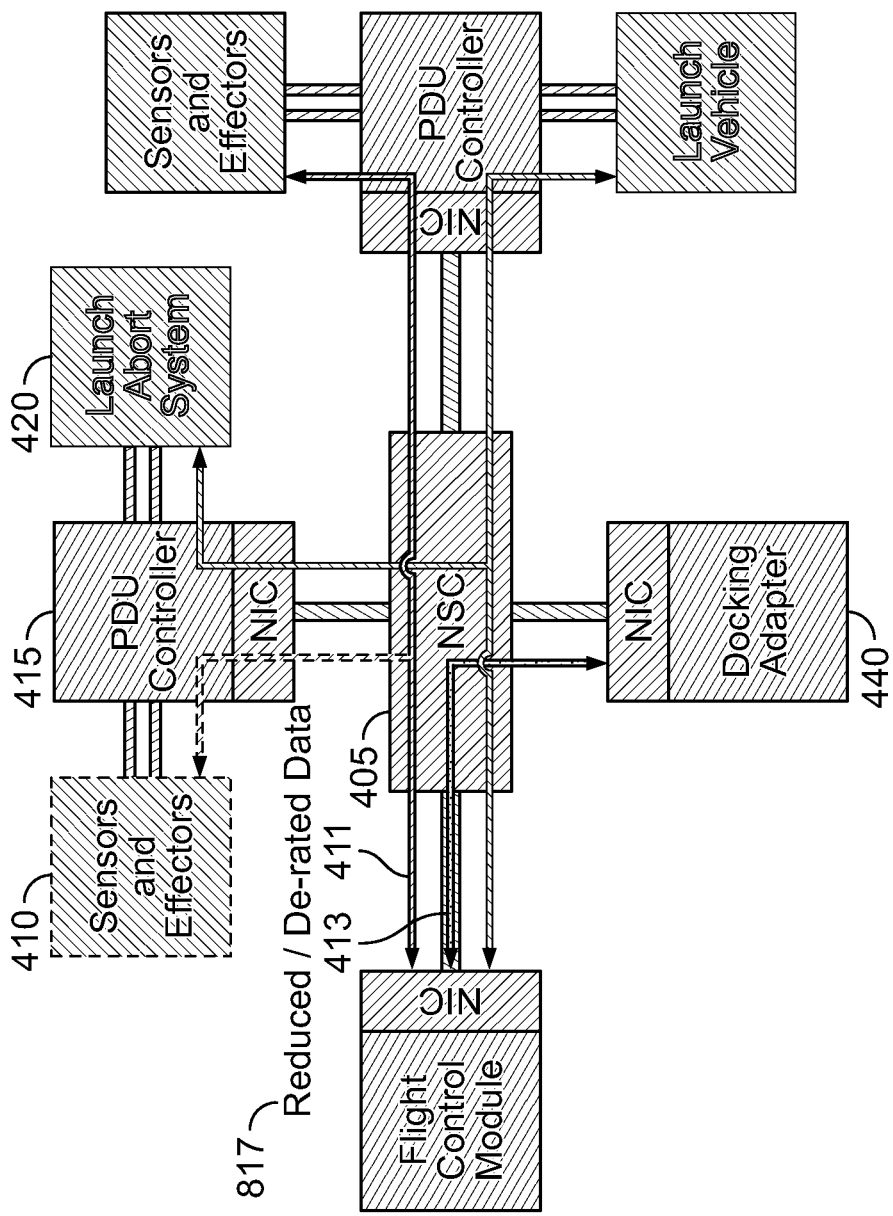
FIG. 8 is a functional block diagram illustrating a TTE network with active items in a docking phase with reduced-rate CCFS in accordance with exemplary embodiments.

FIG. 8 is a functional block diagram illustrating a TTE network 400 of another configuration definition of active items using a CCFS 411 and the docking data feature set 413 in accordance with exemplary embodiments. FIG. 8 illustrates another approach to specifying system configurations to support a docking configuration different than the approach of FIG. 7. In FIG. 8, the active items include a reduced set of functionalities characterized by requiring the same set of VLs for the same FSs but at lower rates 817 (reduced and de-rated data), the tooling can allow the specification of rate reductions for individual VLs in each of the active feature sets. Hence, in the docking phase, the CCFS 411 is configured with specific VLs at lower harmonic transmit rates.

Figure 9:
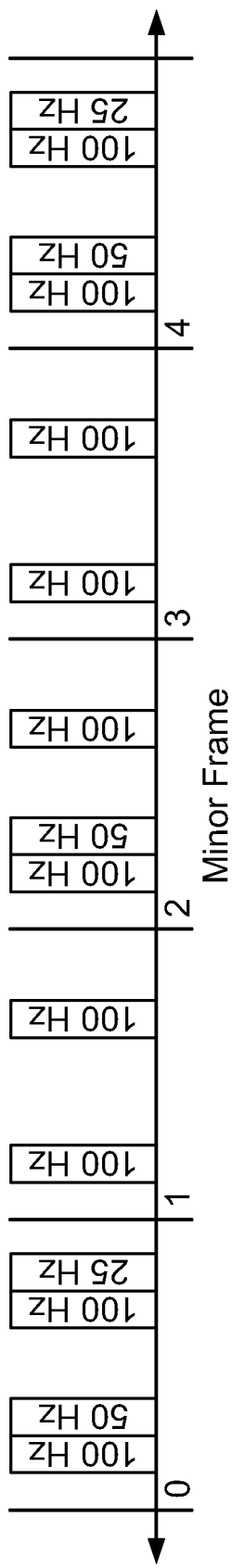
FIG. 9 is a graph of a timeline of an exemplary CCFS schedule for a CDM-enabled TTE implementation in accordance with exemplary embodiments.

FIG. 9 illustrates a simplified global network timeline consisting of 100 Hz, 50 Hz, and 25 Hz traffic reservations for the CCFS 411 (Of FIG. 4) feature set in the example TTE network. Since all target configuration definitions include the CCFS feature set, the tooling maintains this schedule throughout subsequent scheduling activities. In the case of a fully CDM-enabled TTE implementation (i.e. TTE network 400), there can be configured scheduling logic to generate completely or nearly completely independent schedules per target configuration. However, in such a case, if the functionality does not exist in the fielded hardware, then in implementation, maintaining separate schedule information for TT traffic will likely require greater-sized configuration tables than may be supported. Hence, to avoid this issue, the configuration for the tooling should or must define identical sets of scheduling information for each feature set across independent configurations in the TTE network.

This allows variable time allocations for I/O processing of network scheduling and configuration tools and the intelligence (via intelligent applications) to use configuration-specific timing for any traffic unique to that configuration definition. This allocation can be used to determine worst-case I/O constraints for a particular VL found across all of the active configuration definitions enabled which provides for different time allocations to application partitions that can be dependent on each mission phase or vehicle configuration.

The first schedule pass would represent the collection of feature sets that are common to all target configuration definitions, and the result of that schedule pass can be used to populate a generic global bin set. This generic global bin set in FIG. 9 is used as a baseline for each successive schedule pass. The bin sets resulting from all schedule passes can be preserved by the NST outputs so subsequent attempts to schedule additional VLs may also be attempted in the future. To support incremental re-configuration, a unique set of formatted network outputs is produced after each specified configuration definition is successfully scheduled. To support the hybrid reconfigurable system, tooling would post-process the successfully scheduled network based on the implemented HW constraints to allow for the overlapping valid VL definitions to coexist in the loaded network tables. The HW constraints are unique to specific versions of target hardware but can include, for example, requirements such as N clocks separating each scheduled VL transmit trigger value. The post-processing logic in the tooling would, therefore, shift any conflicting VLs in time to prevent overlap and adjust corresponding NSC arrival times accordingly.

Figure 10:
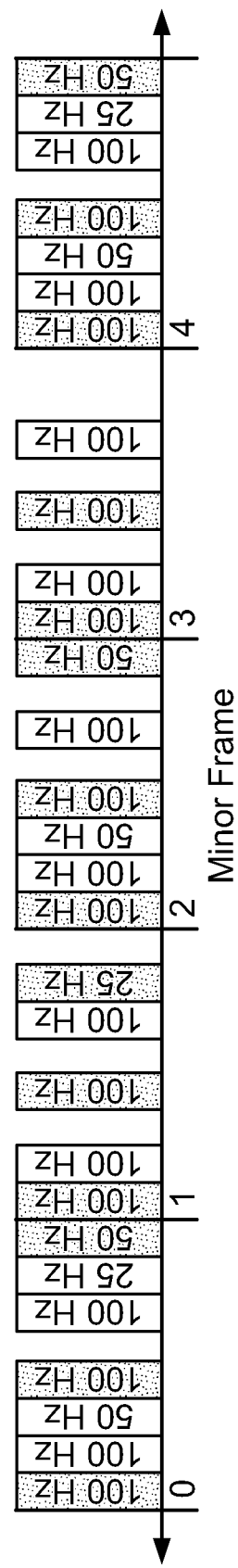
FIG. 10 is a graph of a timeline of an exemplary CCFS launch phase schedule for a CDM-enabled TTE implementation in accordance with exemplary embodiments.

FIG. 10 is a graph of a timeline of an exemplary launch phase schedule for a CDM-enabled TTE implementation in accordance with exemplary embodiments. FIG. 7 exemplifies this scheduling paradigm. The NSC tool schedules VL traffic for the launch-specific feature set in the gaps left by the CCFS VLs. For this example, the NST treats the launch phase and docking phase as independent configuration definitions.

Figure 11:
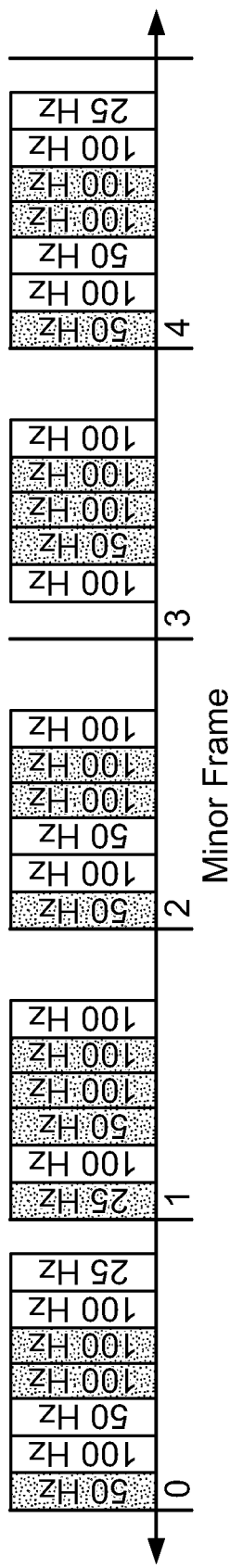
FIG. 11 is a graph of a timeline of an exemplary CCFS docking phase schedule for a CDM-enabled TTE implementation in accordance with exemplary embodiments.

FIG. 11 is a graph of a timeline of an exemplary docking phase schedule for a CDM-enabled TTE implementation in accordance with exemplary embodiments. This is an independent configuration definition that supports vehicle docking operations. The CCFS schedule slots remain identical between the configurations. If the mission phase can include a reduced set of functionalities which is characterized by requiring the same set of VLs but at lower rates, the NST can allow the specification of rate reductions for individual VLs in a feature set. The requirements for VL schedule commonality drive the need to retain identical trigger points in the global schedule, but the scheduling tooling can free alternating harmonic VL slots in the global schedule. Also, in the case of different hardware which is implemented with native CDM support, the configuration tables can maintain unique references to different schedules per required configuration definition. The current devices require that end systems and switches preserve all the scheduled slots for these reduced-rate VLs, so when the feature set is designed, the feature set should be limited to data sourced by high-integrity devices.

Figure 12:
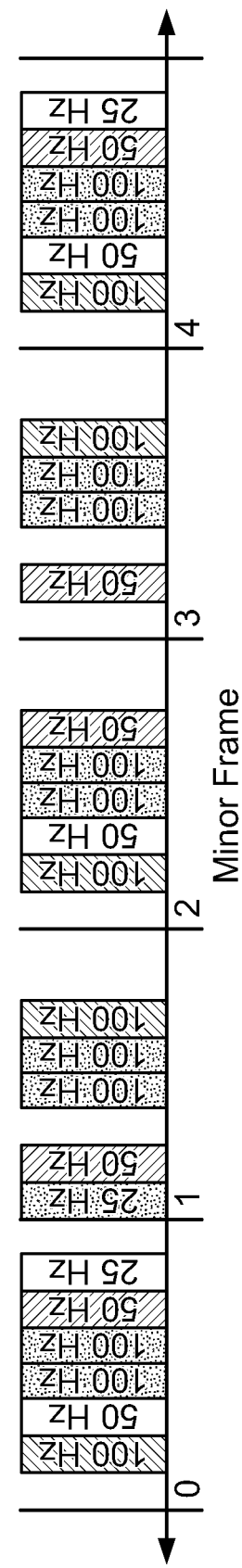
FIG. 12 is a graph of a timeline of an exemplary CCFS docking phase schedule with CCFS rate reduction for a CDM-enabled TTE implementation in accordance with exemplary embodiments.

FIG. 12 is a graph of a timeline of an exemplary docking phase schedule with CCFS rate reduction for a CDM-enabled TTE implementation in accordance with exemplary embodiments. FIG. 12 illustrates CCFS traffic with 100 Hz traffic reduced to 50 Hz. The patterned traffic reservation blocks represent the reduced-rate slots as well as the 50 Hz docking traffic that can now occupy those freed schedule areas. By reducing the rates of VL traffic in alternate configuration definitions, the ability of the scheduling tools is improved to converge on valid global schedules, to limit resource utilization, and to potentially reduce system sizes in high-traffic systems.

Figure 13:
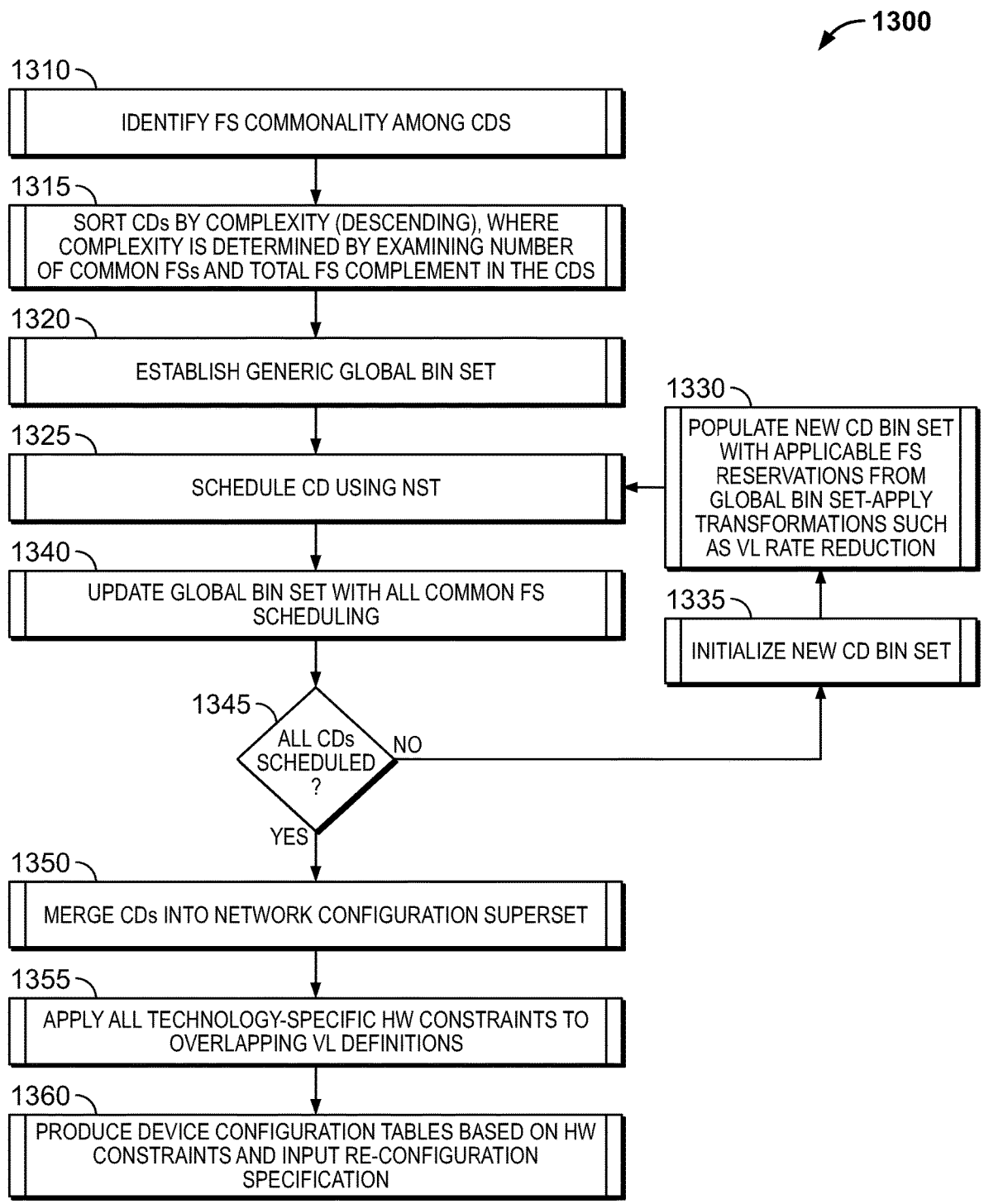
FIG. 13 is a flowchart for a rate reduction for a CDM-enabled TTE implementation in accordance with exemplary embodiments.

FIG. 13 is a flowchart for a rate reduction for a CDM-enabled TTE implementation in accordance with exemplary embodiments. In FIG. 13 an exemplary flowchart 1300 of the multistep scheduling process is presented. At task 1310, initially, the FSs commonality among the CDs is identified. In an initial schedule pass executed by the NST for collecting feature sets of all or nearly all of the target configuration definitions, the commonality between the respective FSs of each CD can be identified. By including data flows to the network scheduling tool suite, with the collected feature sets, the specification of VLs grouped into FSs and the specification of one or more target configuration definitions that include various combinations of the FSs is enabled. At task 1315, the CDs are sorted by complexity in descending order where the complexity is determined by examining the number of common FSs and the total FS which are complementary in the CDs. After this determination, at task 1320, which is after collecting the results from the initial schedule pass, a generic bin set is populated based on the results, and the generic global bin set is established as a baseline for use in successive scheduled passes.

At task 1325, each CD is scheduled by the NST. Next, after the initial schedule of the CD or CDs by the NST, the generic global bin set is updated with all the common FS scheduling. At task 1345, it is determined if all the CDs have been cycled through and scheduled. If not, then the flow reverts back to at task 1335, initializing a new CD bin set, and at task 1330 populating the new CD bin set with the applicable FS reservations from the Global Bin Set, and applying a transformation such as VL rate reduction. At task 1330 for each VL in a feature, rate reductions are applied. Reducing the rates of VL traffic in alternate configurations can improve the ability of scheduling tools to converge on valid global schedules, limit resource utilization, and potentially reduce system sizing in high-traffic systems. Scheduling algorithm updates would provide multiple scheduled configurations wherein feature sets common to multiple independent configuration definitions, CCFSs, maintain identical timing for scheduled I/O triggers. The algorithm would overlap scheduled I/O triggers for mutually exclusive feature sets. For any configurations that include common VLs but at different rates, the tooling would schedule the VLs at the highest specified rate and then de-rate them by removing harmonic instances of the VLs until the tool achieves the desired lower rate. For a hybrid reconfiguration approach, the tooling would produce tables for end-system devices that include all VL triggers from all specified independent configuration sets and multiple tables for each high-integrity switching device-specific to an independent configuration definition.

The flow proceeds to again schedule the CD using the NST 1325 and subsequently again updating the global bin set at task 1340 with all the common FS being scheduled.

Also, the bin set that is collected from all the scheduled passes is preserved by the NST tool outputs to enable subsequent attempts to schedule additional VL's needed in future attempted executions. The collected information can or must also include the integrity level of target network nodes. By preserving the data, VL changes between configurations can include the re-use of VL IDs and reducing the rate of a VL in an alternate configuration. The CCFS feature set is reserved and in this case for an exemplary timeline of time slots at 100 HZ, 50 HZ, and 25 HZ.

Alternatively, if all the CDs are scheduled at task 1345, then at task 1350 the CDs are merged into the Network configuration superset. At task 1355, the technology-specific hardware constraints to overlapping VL definitions are applied. Hence, the tooling post-processing is executed based on the implemented hardware configurations used in each phase of the spacecraft. In this case there about 14 different phase configurations for each flight phase. This allows the overlapping of valid VL definitions to coexist in loaded network tables for each hardware configuration. The hardware constraints are unique to each configuration, and specific to each version of targeted hardware but can be modified with system requirements such as N clocks separating each scheduled VL transmit trigger value. Then, at task 1360, the device configuration tables based on the HW constraints are produced and inputs of the re-configuration specification are performed.

Also, to support incremental re-configuration, a unique set of formatted network outputs is produced after each specified configuration definition is successfully scheduled. The VL traffic is scheduled for specific configuration definitions (i.e. for launch, docking, etc. . . . ), and CCFS scheduled time slots that are identical are identified across the specific configurations. This can support a hybrid reconfigurable system where the tooling would post-process a scheduled network based on implemented hardware constraints and allow the overlapping of valid VL definitions to coexist in the loaded network tables.

Currently, the TTE-enabled hardware does not contain any configuration information that can uniquely identify any table entries specific to VLs as being part of a given FS or target configuration definition. This invention can also support a configuration-aware upgrade to current TTE-enabled hardware wherein configuration tables defining VL attributes in the TTE network hardware contain a bit vector representing a one-hot encoded identifier of valid configuration identifications to which the current table entry applies along with a global register that represents the currently-operating configuration. For example, in a system supporting 16 unique configurations, a 16-bit vector would be required for each entry in each affected table, and a 4-bit value would be required for the global currently-operating configuration register. Logic in the HW devices would need to be updated to mask and compare the valid configuration vector in table entries to the currently-operating configuration register value to determine if those table entries are valid for the currently-operating configuration. This is a relatively small update to the hardware devices that would allow the CDM approach to be supported natively in hardware and reduce the burden on software configuration requirements.

Tooling will need to support any hardware-specific requirements and constraints such as schedule trigger separation requirements and perform any timing adjustments required to accommodate the current-generation hardware. At task 1355, the post-processing logic in the tooling would, therefore, shift any conflicting VLs in time to prevent that overlap and adjust corresponding NSC arrival times accordingly.

Figure 14:
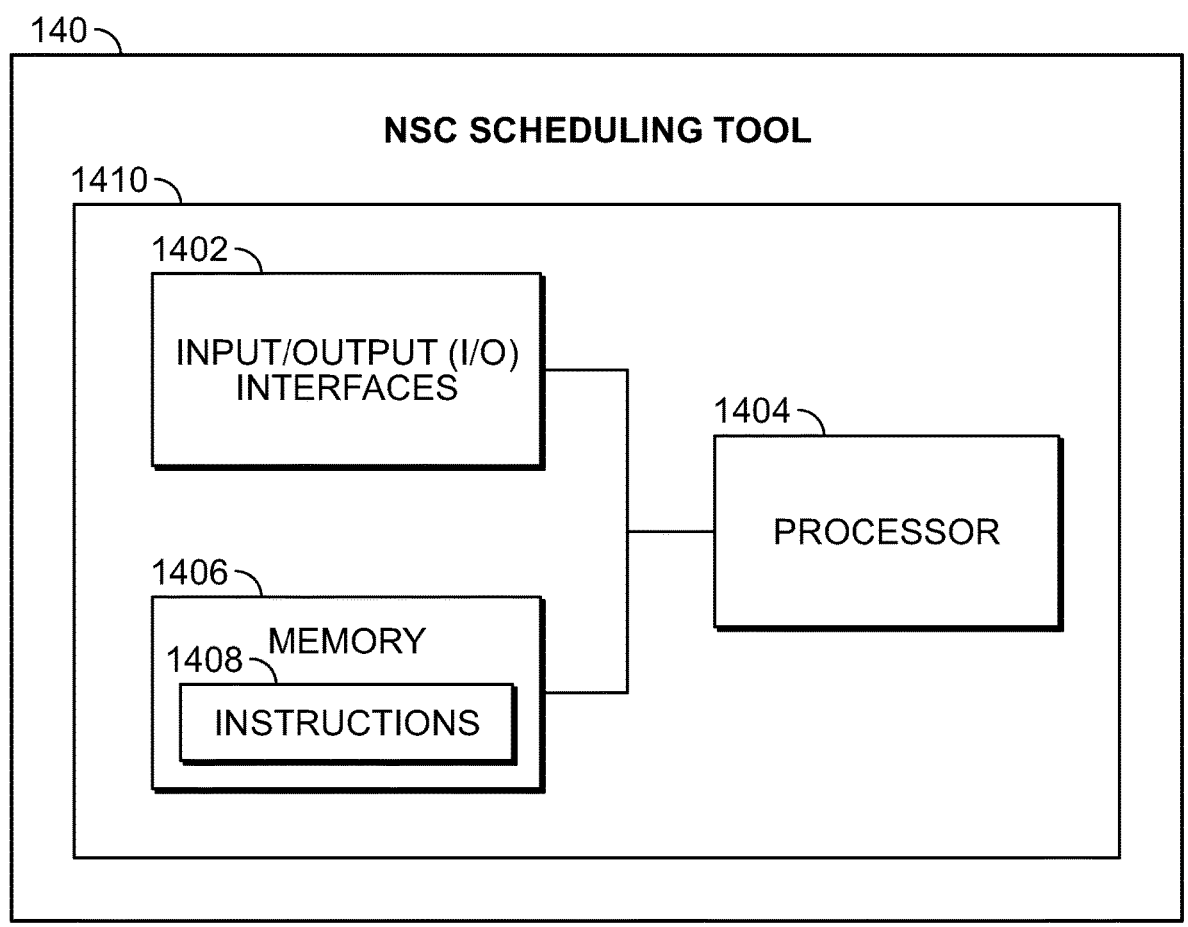
FIG. 14 is a block diagram of one embodiment of an exemplary Network Scheduling Tool (NST) in accordance with exemplary embodiments.

FIG. 14 is a block diagram of one embodiment of an exemplary Network Scheduling Tool (NST) in accordance with various embodiments. The TTE network 100 (of FIG. 1) with the NST 1400 can be implemented using suitable hardware and protocols which can be configured to support one or more of the functions described herein. For example, for purposes of explanation, the embodiments described herein are implemented using the TTE protocol and compatible hardware as defined in the SAE AS6802 standard. However, it is to be understood that other hardware and protocols can be used in other embodiments. For example, other exemplary network implementations include, but are not limited to, ethernet-based networks including Avionics Full-Duplex Switched (AFDX) Ethernet defined in the ARINC 664 Part 7 standard and non-Ethernet based store and forward networks. The NST 1400 includes a Network Scheduling Tool (NST) 1410 used to schedule transmission of messages (also referred to herein as frames) through the TTE network as well as determine other configuration parameters for operation of the TTE network.

The NST 1410 provides configuration data for onboard communications between each of the subsystems. inputs for use by embodiments of the NST 1410 and exemplary schedule and configuration parameters output by embodiments of the NST 1410. In particular, the exemplary inputs include VL inputs, global system inputs, and localhost inputs. The VL inputs for each VL can include the VL identification number, the source network interface card (NIC), the set of reception nodes, routing information, payload size, traffic class, transmit rate, and schedule type of a fast pass or a normal pass scheduling.

FIG. 14 illustrates an NST 1410 with a processing unit, memory, and interface of an exemplary NST in accordance with an embodiment. The NST 1410 includes an input/output interface 1402, a processing unit 1404, and a memory 1406. Network scheduling instructions 1408 are stored in the memory 1406. The processing unit 1404 includes or functions with software programs, firmware or other computer-readable instructions (e.g., network scheduling instructions 1408) for carrying out various methods, process tasks, calculations, and control functions, used in performing the functions described herein, such as scheduling feature sets of the TTE network based on the target configuration of specified features sets connected to the control channel within the TTE network; for populating a timeline associated with each feature set and VL specification using a generic global bin set designated as a baseline bin set for use in successive scheduling passes, and for reconfiguring incrementally using specified upgrade zones composed of select NSC. For example, this may include a described transition from a current CD to a newly specified CD associated with different FSs. The NST 1400 and NST 1410 can synchronize the schedule using the CCFS other FSs resulting in configured sets of VLs with a least amount of variations that compose the other FSs and preserving at least some commonality between FSs in multiple target CDs in the NCS of the TTE network.

These instructions are typically stored on any appropriate computer-readable medium used for storage of computer-readable instructions or data structures. The computer-readable medium can be implemented as any available media that can be accessed by a general-purpose or special-purpose computer or processor, or any programmable logic device. Suitable processor-readable media may include storage or memory media such as magnetic or optical media.

By executing the network scheduling instructions 1408, the processing unit 1404 computes network configuration and scheduling tables which are output via the input/output interface 1402. The network scheduling instructions 1408 are configured to cause the processing unit 1404 to implement some or all of the techniques described herein to compute the configuration and schedule tables. The configuration and schedule tables can be loaded into the various nodes (e.g., end systems and switches) of the network for managing the frames that flow through the network. Hence, the NST 1410 need not be implemented as a node in the network.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Also, those skilled in the art will appreciate that the embodiments described herein are merely exemplary implementations The various illustrative logical blocks, modules, and circuits described in connection with the embodiments disclosed herein may be implemented or performed with a general-purpose processor, a digital signal processor (DSP), an application-specific integrated circuit (ASIC), a field-programmable gate array (FPGA) or another programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A method for orchestrating the re-configuration of a Time-Triggered Ethernet (TTE) network by providing scheduling and configuration information for a plurality of configuration definitions (CDs) within a network configuration superset (NCS) by a Network Scheduling Tool (NST), the method comprising:
   coupling a plurality of Feature Sets (FSs) to at least one common control FS (CCFS) within the TTE network to enable control by the NST of each FS by a runtime procedure wherein each FS of the plurality of FSs is composed of at least one group of Virtual Links (VLs);
   scheduling, by the NST, the plurality of features sets (FSs) of the TTE network based on at least one target configuration of a specified FSs coupled to the CCFS within the TTE network;
   collecting, in a first scheduling pass by the NST, multiple FSs related to a plurality of phase configurations wherein one or more of the FSs is used to derive a specified target FS configuration; and
   forming, by the NST, a common FS by using an application to determine one or more features associated with each FS of the plurality of FSs.

2. The method of claim 1, wherein each FS of the plurality of FSs comprises at least one VL specification, metadata set comprising identification information, and a miscellaneous data set comprising inter-VL timing and protocol information for each VL specification with a referenced FS.

3. The method of claim 1, wherein each CD comprises at least one FS, metadata set comprising identification information, and a miscellaneous data set comprising modification information for each VL specification within a referenced FS.

4. The method of claim 3, wherein the NCS comprises at least one CD, the metadata set comprising identification information, and the miscellaneous data set comprising network-wide static configuration parameters.

5. The method of claim 4, further comprising:
   populating, by the NST, a timeline divided into a generic global bin set designated as a baseline bin set for use in successive scheduling passes wherein the global bin set is preserved by the NST for further processing of the plurality of FSs and for populating of the timeline in successive pass operations.

6. The method of claim 5, further comprising:
   reconfiguring incrementally, by the NST, as specified in at least one upgrade zone of an individual plane of the TTE network wherein the NSCs transition from operating on a plane of a current CD to a newly specified CD associated with different FSs.

7. The method of claim 6, further comprising:
   synchronizing, by the NST, by scheduling in a similar manner using the CCFS other FSs resulting in configured sets of VLs with a least amount of variations that compose the other FSs and preserving at least some commonality between FSs in multiple target CDs in the NCS of the TTE network.

8. The method of claim 7, further comprising:
   re-configuring, by the runtime procedure, using specified upgrade zones composed of select NSC planes each new table associated with a corresponding CD until in incremental transitions a final CD configuration transition is completed.

9. The method of claim 8, further comprising:
scheduling, by the NST, using the CCFS to preserve critical control of phases of vehicle operation throughout each incremental transition wherein each mutually exclusive FSs are scheduled on top of an existing scheduled FSs enabling VLs in each FS configuration to be configured in accordance with one set of Network Interface Card (NIC) tables.

10. The method of claim 9, further comprising:
producing, by the NST, a unique NIC table for use by the NSC per target CD configuration.

11. A system comprising at least one processor, communicatively coupled to a system memory element configured to implement a Network Scheduling Tool (NST) to schedule a plurality of Feature Sets (FSs) comprising a plurality of Virtual Links (VLs) in a Time-Triggered Ethernet (TTE) network wherein each of the plurality of VLs having a scheduled rate for a runtime procedure, the system comprising:
a plurality of FSs comprising at least one Configuration Definition (CD) in a Network Configured Superset (NCS) and
wherein the NST is configured to:
schedule a plurality of features sets (FSs) of the TTE network based on at least one target CD of specified FSs within the TTE network;
collect, in a first scheduling pass by the NST, multiple FSs related to a plurality of CDs wherein one or more of the FSs is referenced by more than one CD; and
form, a common control feature set (CCFS) by using an application to determine the FSs common to all specified CDs in the NCS.

12. The system of claim 11, wherein the NST is further configured to:
populate a timeline associated with each FS with a generic global bin set designated as a baseline bin set for use in successive scheduling passes, wherein the global bin set is preserved by the NST for further processing of the plurality of FSs and populate the timeline in successive pass operations.

13. The system of claim 12, wherein the NST is further configured to:
re-configure incrementally as specified in at least one upgrade zone of an individual plane of the TTE network wherein the NSCs operate on that plane transition from a current CD to a newly specified CD associated with a different FSs.

14. The system of claim 13, wherein the NST is further configured to:
similarly, synchronize by scheduling using the CCFS other FSs that result in configured sets of VLs with a least amount of variations that comprise other FSs and preserve at least some degree of commonality between FSs in multiple target CDs in the NCS of the TTE network.

15. The system of claim 14, wherein the NST is further configured to:

re-configure using specified upgrade zones comprising select NSC planes each new table associated with a corresponding CD until in incremental transitions a final CD configuration transition is completed.

16. The system of claim 15, wherein the NST is further configured to:
schedule using the CCFS to preserve critical control of phases of vehicle operation throughout each incremental transition wherein any mutually exclusive FSs can be scheduled on top of existing scheduled FSs enabling, VLs in each FS configuration to be configured in accordance with one set of Network Interface Card (NIC) tables.

17. The system of claim 16, wherein the NST is further configured to:
produce a unique table for use by the NSC per target CD configuration.

18. An apparatus configured with a Network Scheduling Tool that comprises a processor to schedule a plurality of configuration definitions (CDs) within a network configuration superset (NCS) in a Time-Triggered Ethernet (TTE) network, wherein the processor is programmed by a set of instructions to schedule time-triggered traffic, the processor configured to:
schedule the VL specifications defined in a plurality of features sets (FSs) of the TTE network based on at least one target CD of specified FSs within the TTE network;
collect, in a first scheduling pass by the NST, multiple FSs related to a plurality of CDs wherein one or more of the FSs is referenced by more than one CD; and
form a common control feature set (CCFS) by using an application to determine the FSs common to all specified CDs in the NCS.

19. The apparatus of claim 18, wherein the processor is further programmed to:
populate a timeline associated with each FS and VL specification using a generic global bin set designated as a baseline bin set for use in successive scheduling passes, wherein the global bin set is preserved by the NST for further processing of the plurality of FSs and populating of the timeline in successive pass operations.

20. The apparatus of claim 19, wherein the processor is further programmed to:
re-configure incrementally using specified upgrade zones composed of select NSC planes each new table associated with a corresponding CD until in incremental transitions a final CD configuration transition is completed; and
similarly synchronize by scheduling using the CCFS, other FSs resulting in configured sets of VLs with a least amount of variations that compose the other FSs, and preserve at least some commonality between FSs in multiple target CDs in the NCS of the TTE network.

* * * * *